July 18, 1933.  A. ALSAKER  1,918,441
CONNECTING MEANS
Filed Feb. 8, 1930
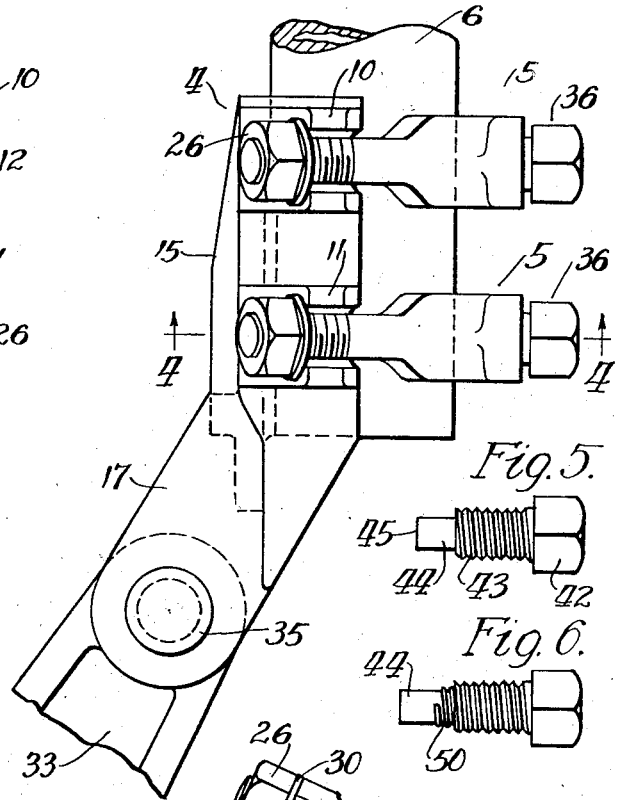
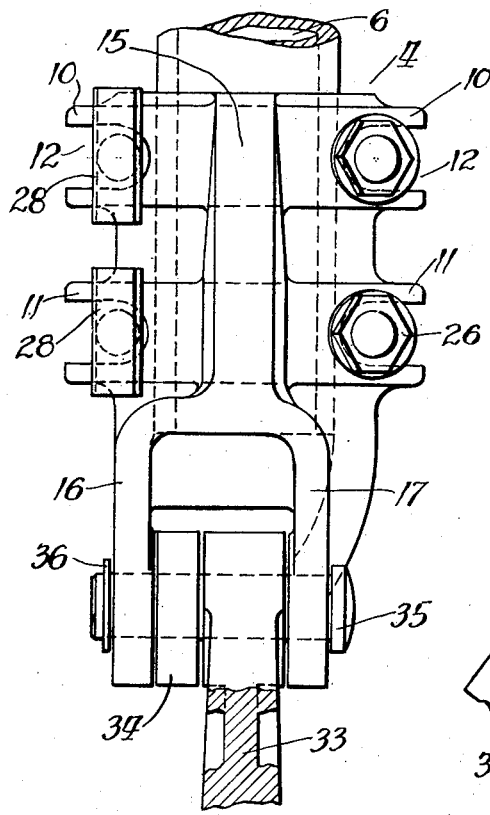
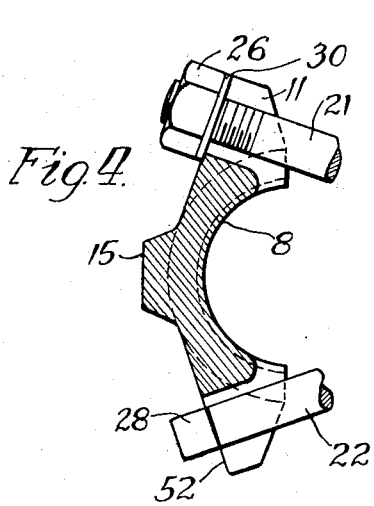
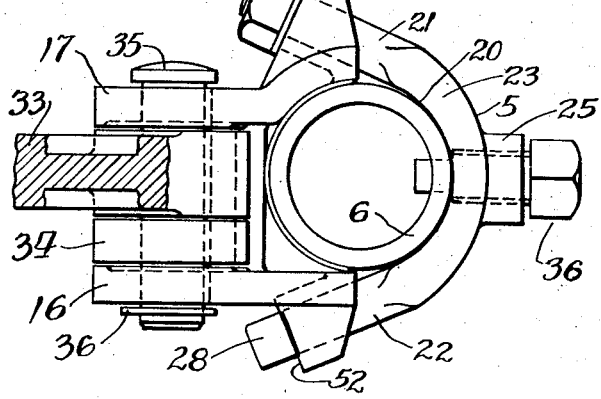
Inventor
Alfred Alsaker
By Brown, Jackson, Boettcher & Dienner
Att'ys.

Patented July 18, 1933

1,918,441

UNITED STATES PATENT OFFICE

ALFRED ALSAKER, OF CHICAGO, ILLINOIS, ASSIGNOR TO THE DELTA-STAR ELECTRIC COMPANY, OF CHICAGO, ILLINOIS, A CORPORATION OF ILLINOIS

CONNECTING MEANS

Application filed February 8, 1930. Serial No. 426,960.

This application is a continuation in part of my pending application Serial No. 325,751, filed December 13, 1928, and relates to connecting means. While the invention of the present application is of general application it is particularly useful for connecting a member such as a collar, a handle, an operating rod, a joint or the like, to a hollow rod or pipe or to a cylindrical member in general. The present invention also relates to a tool for perforating the wall of a pipe or of a cylindrical member in general.

My present invention is in the nature of an improvement and further development of the invention disclosed in Patent No. 1,638,230, granted to me on August 9, 1927. In this prior patent, I have described in detail the utility and the general features of the clamping means disclosed therein, and the manner in which they are used. Therefore, a repetition of the discussion is not deemed necessary in this specification.

The clamping means disclosed in my prior patent includes a set screw for positively locking a clamping member to a pipe. The set screw threads through the clamping member and is forced through the wall of the pipe, cutting threads in the hole it makes as it travels through. The threaded hole made by the set screw is of substantially the same size as the shank of the screw itself. The set screw being of comparatively heavy stock, a relatively large hole is made requiring the exertion of considerable force to turn the set screw through.

I have found that, by cutting down that portion of the set screw which is forced through the pipe to a smaller diameter than the threaded shank of the screw, the set screw may be driven home through the pipe with much less difficulty and yet substantially the same positive locking effect is obtained. I have also discovered that a joint of ample strength is secured, even when that portion of the set screw which is forced into the pipe is perfectly smooth, that is, has no threads. With a set screw of this kind, a smooth hole is punched through the pipe, but the frictional resistance offered by the surface of the hole made in the pipe against the screw turning out is sufficient to prevent such from taking place. Furthermore, by making the reduced portion of the set screw which is forced into the pipe perfectly cylindrical, that is, having the same diameter throughout its length, the hole which is formed in the pipe becomes cylindrical also, and, as a result, even though the screw does retreat somewhat during the course of time, the positive locking effect is still maintained because that portion of the screw still in the hole will still be gripped by the side wall of the hole. This result is to be contrasted with that which would be obtained with a screw which formed a tapered hole. In the latter case, the slightest retreat of the screw would cause the portion of the screw in the hole to separate from the wall of the hole, and consequently the screw would be loose in the hole.

An important feature of my new set screw lies in the fact that because of the reduced diameter of the hole punching portion of the screw a greatly increased unit pressure is obtained and the end of the screw may be made perfectly flat, which obviously makes the screw very much cheaper to manufacture than screws having specially shaped ends. The cutting edge formed at the junction of the cylindrical surface of the punching portion of the screw and the flat end surface is sufficient to sever the plug punched out from the wall of the pipe.

According to one modification of my invention, I provide a set screw in which the lower end portion of the screw which is forced into the pipe is smooth except for a few threads near the top next to the threaded shank of the screw. With this set screw, by the time the threaded portion comes in contact with the pipe, the hole in the pipe is practically made so that the effort necessary to force the threaded portion into the pipe is not added to the maximum effort required to punch the hole. The set screw has the advantages of the former set screw plus those of a set screw which threads into a pipe.

I have further discovered that by chromium plating the set screw, I obtain a much better set screw, inasmuch as it will resist wear better and the cutting edge at the end of the set screw will be retained longer, as a result of which a smoother hole through the pipe is obtained. With a smoother hole through the pipe, more surface will be in actual contact with the surface of the portion of the set screw in the hole, and therefore more resistance will be offered to any tendency of the screw to turn out.

It is a further object of the present invention to provide an improved clevis and yoke construction which is adapted to embrace a pipe or the like and be clamped thereto and locked against lengthwise movement along the pipe by means of my improved set screw. The clevis may be used to connect the pipe to a control rod or to another pipe or it may be used in connection with another clevis to connect two pipes together and to a control rod. The construction is such that the yoke is held in place by means of a single bolt and it may be removed from the clevis by merely loosening the nut and withdrawn therefrom without the necessity of sliding either the clevis or the yoke along the pipe. This is particularly advantageous where a connection is to be made to a long pipe at a point intermediate its ends. By means of this construction it is not necessary to slide either the clevis or the yoke along the pipe at one end thereof.

The attainment of the above and further objects of the present invention will be apparent from the following specification taken in conjunction with the accompanying drawing forming a part thereof.

In the drawing:

Figure 1 is a side view of a section of an operating pipe connected to a control rod by means of my improved connecting device;

Figure 2 is a front view of the mechanism shown in Figure 1;

Figure 3 is bottom end view of the mechanism shown in Figure 1;

Figure 4 is a fragmentary sectional view showing the manner of connecting the yoke to the clevis;

Figure 5 is a view of my improved set screw; and

Figure 6 is a view of a modified form of set screw.

Referring now more particularly to the drawing the connecting means comprises essentially two main parts, a clevis 4 and a yoke 5. The clevis 4 shown in the drawing is adapted to be connected to a pipe 6 by means of two yokes 5 although it is to be understood that a single yoke may be used if desired. The clevis 4 is provided with a cylindrical surface 8 which is adapted to seat upon the outside of the pipe 6, said cylindrical surface extending slightly less than half way round the circumference of the pipe. The clevis is provided with two sets of ears indicated at 10—10 and 11—11 which extend outwardly therefrom and are provided with a generally U-shaped slot indicated at 12—12 for receiving the ends of the yoke. The clevis is provided with a reinforcing ridge 15 and is provided with two spaced arms 16 and 17 for receiving a connecting crank or the like between them. It is to be noted that the arms 16 and 17 are not equally placed from the center line of the clevis. The arms are of equal thickness and the distance between the arms 16 and the center line of the pipe exceeds the distance between the arm 17 and the center line of the pipe by an amount slightly in excess of the thickness of the arm 16. The yoke 5 has a cylindrical portion 20 which is adapted to seat on the pipe 6. A pair of arms 21 and 22 extend from the curved portion 23 of the yoke, said arms being tangent to the curve 20 of the yoke and being substantially 45° to one another. A reinforcing projection 25 is formed on the curved portion 23 of the yoke, said reinforcing portion being tapped and threaded to receive a set screw indicated in general at 36. The end of the arm 21 is screw threaded to receive a nut 26 and the end of the arm 22 has a lug 28 formed thereon and extending at right angles thereto. The lug 28 extends to both sides of the arm 22 as may be seen in Figure 2.

To mount the clevis and yoke upon the pipe 6 the clevis is placed with its circular part 8 around the pipe and the lug 28 of the yoke is inserted into the U-shaped slot 11 of the clevis. At this time the arm 21 is not in embracing relationship to the pipe 6. When the lug 28 has been inserted into the slot 11 the yoke 5 is turned so as to bring the arm 21 into the corresponding slot 12 on the opposite side of the clevis. The bolt 26 is then placed upon the end 21 of the yoke and is turned until it slightly engages the projections on the clevis. It is of course to be understood that if desired a washer, indicated at 30, may be interposed between the nut 26 and the clevis. This washer may of course be omitted if desired. The clevis and the yoke may then be shifted along the pipe until they are brought into the desired position. A crank arm 33, of any approved construction, may then be inserted between the arms 16 and 17 of the clevis and a cylindrical spacer member or washer 34 may likewise be inserted between the arms of the clevis. This washer 34 is of a thickness equal to the thickness of the arm 16 whereby the center line of the crank 33 is in line with the center of the pipe 2. A pin 35 may then be inserted through openings in the arms 16 and 17 and through aligned openings in the crank 33 and in the washer spacer 34. This pin may be retained in place by means of a washer or cotter pin 36 if desired. If desired this washer may be of a construction such as shown in my pending application Serial No. 325,752, filed December 13, 1928, although it is to be understood that any other preferred construction may be used if desired. With the crank 3 inserted in place the nut 26 is tightened to rigidly clamp the yoke and clevis to the pipe 6. The set screw 36, which is of a construction such as shown in either Figures 5 or 6 may then be mounted in place in order to rigidly secure the clevis and yoke against sliding movement along the pipe.

The set screw shown in Figure 5 has a head 42, which may be square or hexagonal or of any other polygonal shape in order to facilitate the turning thereof by means of a wrench or the like, a threaded shank 43, and a smooth cylindrical projection 44 of considerably less diameter than the threaded shank 43. The end of the projection 44 is substantially flat and at right angles to the cylindrical surface of the projection 44, forming a sharp cutting edge at 45. The set screw, after being completely machined is chromium plated to give it a hard wearing surface and to increase its resistance against corrosion. The chromium plating gives the set screw a better cutting surface in that the end of the projection 44 will stand up throughout its entire travel through the pipe. As a result, a neater hole is obtained, and the projection 44 is held therein rigidly by the frictional resistance between the projection 44 and the sides of the hole formed thereby, so as to prevent inadvertent loosening of the set screw. The set screw is turned in the threaded hole in the yoke 5 until the sharp cutting edge 45 abuts against the pipe 6. The screw is then further turned so that the projection 44 is forced into the pipe. This is accomplished primarily by a punching operation with the sharp cutting edge at the juncture of the cylindrical surface of the projection and the end 45 thereof forcing the metal of the pipe 6 to give. Because the area of the end of the set screw is relatively small, an extremely high unit pressure is obtained without applying more than a moderate turning effort. By providing a shoulder between the threaded shank and the perforating portion of the set screw, and screwing the set screw down until this shoulder bears heavily on the surface of the pipe around the hole I find that the set screw tends to be held in place against loosening from the pipe. The heavy pressure around the surface of the pipe immediately around the hole causes the side walls of the hole to be drawn tighter against the sides of the perforated portions of the set screw and the greater the pressure on the surface of the pipe the tighter will the set screw be gripped in the hole. This gripping action greatly increases the frictional resistance offered by the walls of the hole against any tendency of the screw to become loose.

In Figure 6 I have shown a modified form of my set screw. This set screw is similar to the one shown in Figure 5 differing therefrom only in that a few threads, indicated at 50, are provided at the upper end of the projecting portion 44. These threads enter the hole in the wall of the pipe just before the set screw is driven completely home and form corresponding threads in the pipe with the result that a better and firmer union is obtained. This action of the threads 50 does not take place until substantially the entire hole is formed in the pipe so that the necessity of cutting the thread does not add appreciably to the effort required to force the thread screw home. I find that a better joint is secured by providing a square thread at 50 rather than a V-shaped thread as is provided on the shank of the screw. Obviously the pitch of the thread on the projecting portion of the set screw should be the same as the pitch of the thread on the shank of the screw.

To remove the yoke from the pipe it is merely necessary to first unscrew the set screw until the cylindrical projection 44 leaves the pipe 6 and to remove the bolt 26. The arm 22 may then be moved in the slot 11 by turning the yoke 5 about the pipe 6 in a generally clockwise direction as seen in Figure 3. During this turning the arm 21 is withdrawn from the slot 11 wherein it extended. After a small amount of turning of this kind the yoke may be slid along the surface 52 of the ear 11 so as to remove the yoke from the clevis. It is to be noted that the surface 52 makes an angle of approximately 90° with the arm 22 when the yoke is locked to the clevis. Since the arm 21 makes an angle of approximately 45° with the arm 22 then it is apparent that the amount of turning of the arm 22 in order to permit sliding of the projection 28 along the surface 52 is somewhat less than 45°.

An explanation may now be given of the reason for placing the arms 16 and 17 of the clevis 4 at distances unequal from the central plane of the pipe 2. When a single clevis such as the clevis 4 is to be secured to a crank such as the crank 33 there is no particular advantage in this unequal spacing. However when the crank 33 is to be secured to two such clevises then this unequal spacing is of a distinct importance. Consider the case of two pipes such as the pipe 6 in alignment and spaced apart a few inches. Suppose that it is desired to connect both of those pipes to the crank 33. The yoke and clevis assembly 5 and 4 are secured to the pipe 6 and a similar assembly is secured to the pipe beneath the pipe 6. Under these conditions the arm corresponding to the arm 16 of the lower pipe will be on the opposite side of the center line of the pipes, that is on the side opposite to the side occupied by the arm 16 of the clevis 4 of the upper pipe 6. The arms of the two clevises may then be placed in engagement, with the arm 17 of the lower clevis occupying a position corresponding to the position occupied by the washer 34 and the arm 16 of the lower clevis occupying a position on the outside of the arm 17 of the upper clevis. A pin such as the pin 35 may then be used to secure the two clevises together with the crank 33 in position between the arm 17 of the upper clevis and the arm 17 of the lower clevis. Under those conditions the pin 35 must be somewhat longer than the pin shown in Figure 2 since it must extend through an additional arm corresponding to the arm 16 of the lower clevis which arm 16 is now on the outside of the arm 17 of the upper clevis. The manner in which this is done is clearly illustrated in my pending application Serial No. 325,751 of which this application is a continuation in part.

While I have herein shown and described my improved set screw and clevis and yoke construction as used in connection with a pipe and a crank for imparting longitudinal motion to the pipe it is of course to be understood that the present invention is not limited to such use since the set screw may be used independently of the clevis and yoke construction herein described and also it need not be used in connection with means for imparting motion to a pipe.

In compliance with the requirements of the patent statutes I have herein shown and described a preferred embodiment of my invention. It is however to be understood that the invention is not limited to the precise construction herein shown, the same being merely illustrative of the invention. What I consider new and desire to secure by Letters Patent is:

1. A screw for forcing its way through the wall of a pipe, comprising a cylindrical threaded shank terminating in a cylindrical threaded projection of smaller diameter terminating in a smooth cylindrical projection of still smaller diameter.

2. The method of mounting a screw in a piece of metallic material which consists in providing the lower end of the screw with a smooth cylindrical extension of less diameter than the threaded shank of the screw and in providing a sharp cutting edge at the junction of the lateral surface of the extension and the end surface thereof, rotating the screw and contemporaneously advancing it into the material to cause a blank to be severed from the material by the advance of the extension, and thereafter advancing the shank of the screw into the hole formed by the removal of the blank until the shoulder between the threaded shank and the cylindrical extension bears against the surface of the material.

3. For use with a yoke having a threaded hole, a screw having a threaded shank cooperating with the thread in said hole, characterized by the fact that said screw is provided with a cylindrical end extension of smaller diameter than the threaded shank, said extension having a continuous circumferentially extending cutting edge at the junction of the lateral surface of the projection and the end surface thereof for cutting its way into an object to which the yoke may be secured, and said extension being integral with the threaded shank whereby the peripheral pressure on the extension serves to lock the screw against inadvertent rotation and retraction.

4. For use with a yoke adapted to fit against a pipe and having a threaded hole, a screw having a threaded shank cooperating with the threads in said hole, characterized by the fact that the screw is provided with a cylindrical extension of smaller diameter than the threaded shank for piercing its way into a pipe, a portion of said extension being threaded.

5. For use with a yoke adapted to fit against a pipe and having a hole with a V-shaped thread therein, a screw having a shank with V-shaped threads cooperating with the threads in said hole, said screw having a cylindrical extension of smaller diameter than the threaded shank and comprising a punch adapted to punch its way into a pipe, the portion of said extension next to the shank having square threads.

6. An integral self piercing screw comprising a threaded shank having means for turning the same at one end and a punching portion of appreciably reduced diameter at its other end, said punching portion having a hardened wearing surface and being of a cylindrical shape and having a sharp circumferential edge, the part of the punching portion adjacent the threaded shank being screw threaded.

7. An integral self piercing screw comprising a threaded shank having means for turning the same at one end and a punching portion of appreciably reduced diameter at its other end, said punching portion having a hardened wearing surface and being of a cylindrical shape and having a sharp circumferential edge, the part of the punching portion adjacent the threaded shank being provided with substantially square screw threads.

8. Means for holding a member embracing a pipe against turning on the pipe, said means comprising a self piercing set screw having a threaded shank threaded through said member and having a hardened cylindrical punch portion adapted to bear against the pipe and to punch a hole in the pipe as the screw is advanced, said punch portion being an integral part of the screw whereby the peripheral pressure exerted on the punch portion by the adjacent sheared metal serves to hold the screw portion against becoming loosened.

ALFRED ALSAKER.